United States Patent
Fukuda

(10) Patent No.: US 12,541,691 B2
(45) Date of Patent: Feb. 3, 2026

(54) MIXUP DATA AUGMENTATION FOR KNOWLEDGE DISTILLATION FRAMEWORK

(71) Applicant: INTERNATIONAL BUSINESS MACHINES CORPORATION, Armonk, NY (US)

(72) Inventor: Takashi Fukuda, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1001 days.

(21) Appl. No.: 17/119,592

(22) Filed: Dec. 11, 2020

(65) Prior Publication Data

US 2022/0188643 A1  Jun. 16, 2022

(51) Int. Cl.
*G06N 3/088* (2023.01)
*G06N 3/044* (2023.01)
(Continued)

(52) U.S. Cl.
CPC .............. *G06N 3/088* (2013.01); *G06N 3/044* (2023.01); *G06N 3/045* (2023.01); *G10L 15/02* (2013.01);
(Continued)

(58) Field of Classification Search
CPC ........ G06N 3/088; G06N 3/045; G06N 3/044; G10L 2015/025; G10L 15/02; G06Q 10/10
See application file for complete search history.

(56) References Cited

U.S. PATENT DOCUMENTS 11,721,325 B1 * 8/2023 Park ...................... G10L 15/063
704/200
2018/0336465 A1  11/2018 Kim et al.
(Continued)

FOREIGN PATENT DOCUMENTS

CN  109448706    *  3/2019
CN  109448706 A  *  3/2019  ............. G06N 3/044
(Continued)

OTHER PUBLICATIONS

Wang D et al., Classification of the Mask Augsburg Speech Corpus (MASC) Using the Consistency Learning Method. In 2020 5th International Conference on Communication, Image and Signal Processing (CCISP) (Nov. 13, 2020).*
(Continued)

*Primary Examiner* — Adam C Standke
(74) *Attorney, Agent, or Firm* — Tutunjian & Bitetto, P.C.; Robert Richard Aragona

(57) ABSTRACT

A method of training a student neural network is provided. The method includes feeding a data set including a plurality of input vectors into a teacher neural network to generate a plurality of output values, and converting two of the plurality of output values from the teacher neural network for two corresponding input vectors into two corresponding soft labels. The method further includes combining the two corresponding input vectors to form a synthesized data vector, and forming a masked soft label vector from the two corresponding soft labels. The method further includes feeding the synthesized data vector into the student neural network, using the masked soft label vector to determine an error for modifying weights of the student neural network, and modifying the weights of the student neural network.

20 Claims, 10 Drawing Sheets

(51) Int. Cl.
  *G06N 3/045* (2023.01)
  *G06Q 10/10* (2023.01)
  *G10L 15/02* (2006.01)

(52) U.S. Cl.
  CPC ........ *G06Q 10/10* (2013.01); *G10L 2015/025* (2013.01)

(56) References Cited

U.S. PATENT DOCUMENTS

2019/0130896 A1 5/2019 Zhou et al.
2019/0304437 A1* 10/2019 Qian ................. G10L 15/063

FOREIGN PATENT DOCUMENTS

| CN | 109637546 A | 4/2019 |
| CN | 111341341 A | 6/2020 |
| CN | 111640425 A | 9/2020 |
| JP | 2019159654 A | 9/2019 |
| WO | 2020/194077 A1 | 10/2020 |

OTHER PUBLICATIONS

Liang KJ et al., Mixkd: Towards efficient distillation of large-scale language models. arXiv preprint arXiv:2011.00593. (Nov. 1, 2020).*
Fonseca E, et al., Addressing missing labels in large-scale sound event recognition using a teacher-student framework with loss masking. IEEE Signal Processing Letters (Jul. 1, 2020).*
Zhang, Jihang, and Jie Wu. "DCASE 2019 Task 2: Semi-Supervised Networks With Heavy Data Augmentations to Battle Against Label Noise in Audio Tagging Task." (Year: 2019).*
Zhang, et al. "mixup: Beyond empirical risk minimization." arXiv preprint arXiv:1710.09412 (Year: 2018).*
Fukuda et al., "Implicit Transfer of Privileged Acoustic Information in a Generalized Knowledge Distillation Framework", INTERSPEECH 2020, Oct. 2020, pp. 41-45.
Gao et al., "An Adversarial Feature Distillation Method for Audio Classification", IEEE Access, Jul. 2019, pp. 105319-105330.
Gao et al., "Multi-Representation Knowledge Distillation For Audio Classification", utiarXiv:2002.09607v1 [cs.MM] Feb. 22, 2020, pp. 1-10.
Zhang et al., "mixup: Beyond Empirical Risk Minimization", arXiv:1710.09412v2 [cs.LG] Apr. 27, 2018, pp. 1-13.
Heo et al., "Acoustic scene classification using teacher-student learning with soft-labels", INTERSPEECH 2019, Sep. 2019, 6 pages.
Medennikov et al., "An investigation of mixup training strategies for acoustic models in Asr", INTERSPEECH 2018, Sep. 2018, pp. 2903-2907.
Mell et al. "The NIST Definition of Cloud Computing", NIST Special Publication 800-145, 2011, 7 pages.
Wang et al., "Neural Networks Are More Productive Teachers Than Human Raters: Active Mixup for Data-Efficient Knowledge Distillation from a Blackbox Model", arXiv:2003.13960v1 [cs.CV] Mar. 31, 2020, pp. 1-10.
Yun et al., "Regularizing Class-wise Predictions via Self-knowledge Distillation", CVPR 2020, Jun. 2020, pp. 13876-13885.
International Search Report issued in corresponding PCT Application Serial No. PCT/CN2021/124782 dated Jan. 24, 2022 (9 pgs).
Wang et al., "Neural networks are more productive teachers than human raters: Active mixup for data-efficient knowledge distillation from a blackbox model", InProceedings of the IEEE/CVF Conference on Computer Vision and Pattern Recognition 2020, Mar. 31, 2020, pp. 1498-1507.
Fukuda Takashi, "Neural Speech Recognition Techniques Targeting Conversational Speech for Real World Environments", IPSJ SIG Technical Report, Spoken Language-Processing (SLP), 2020-SLP-132 [online] No. 7, Information Processing Society of Japan, May 30, 2020, pp. 1-6.
Japan Patent Office, "Decision to Grant a Patent," Jan. 29, 2025, 05 Pages, JP Application No. 2023-534230.

* cited by examiner

MIXUP DATA AUGMENTATION FOR KNOWLEDGE DISTILLATION FRAMEWORK

BACKGROUND

The present invention generally relates to training neural networks, and more particularly to the use of mix-up augmentation in training neural networks with knowledge distillation for speech recognition.

In artificial neural networks (ANN), "learning" occurs through a change in weights applied to the data inputs of each neuron in the neural network. An artificial neural network can have one or more layers of neurons depending on the neural network architecture. Training of the neural network can be conducted using training pairs, including input data and an expected output/result (i.e., hard labels). Training the neural network then involves feeding the training pairs into the neural network and generating a prediction about the output (i.e., soft labels). The resulting or predicted output can be compared to the expected output for each of the training pairs to determine the correctness or incorrectness of the predictions. Feedback from the correctness and incorrectness of the predictions in comparison to the expected output (e.g., errors) can be used to adjust the weights applied to the data inputs to make the subsequent predictions more accurate. The weights can be successively adjusted using multiple training pairs and/or multiple iterations (e.g., epochs) of training.

A time-series is a collection of observations made sequentially through time, where each data segment may have its own time stamp. Temporal problems can be solved by observing past values of a time series to forecast future value(s). Some neural networks can utilize memory to process the inputted temporal information. Recurrent neural networks (RNN) have feedback connections and internal states that can provide such memory. In speech recognition, the neural network can be trained to translate audio files including phonemes, which can be translated into characters and words that can have contextual meaning. A phoneme is a unit of sound that can distinguish one word from another in a particular language, whereas a phone is any distinct speech sound.

Automatic Speech Recognition (ASR) systems can process user inputs from various acoustic settings. A speech sequence processed by such systems can include inputs from environments with stationary and nonstationary noises like restaurants or exhibition halls, meeting recordings in very reverberant settings, emotional speech, and distorted signals with time-frequency bandwidth loss due to faulty devices or transmission network conditions.

Speech Recognition, however, can be too computationally demanding to run on edge devices like smart phones and other embedded devices. Neural models can have millions or even billions of parameters, which can make them too large to be deployed on edge devices (e.g., smart phones, tablets, etc.). Knowledge distillation relates to model compression by teaching a smaller neural network what to do using a larger, trained neural network. The student network can be trained to learn the behavior of the teacher network by trying to replicate the outputs at each level/layer rather than just final value(s).

SUMMARY

In accordance with an embodiment of the present invention, a method of training a student neural network is provided. The method includes feeding a data set including a plurality of input vectors into a teacher neural network to generate a plurality of output values, and converting two of the plurality of output values from the teacher neural network for two corresponding input vectors into two corresponding soft labels. The method further includes combining the two corresponding input vectors to form a synthesized data vector, and forming a masked soft label vector from the two corresponding soft labels. The method further includes feeding the synthesized data vector into the student neural network, using the masked soft label vector to determine an error for modifying weights of the student neural network, and modifying the weights of the student neural network.

In accordance with another embodiment of the present invention, a processing system for training a student neural network is provided. The processing system includes one or more processor devices, a memory in communication with at least one of the one or more processor devices, and a display screen, wherein the memory includes: a teacher neural network configured to receive a data set including a plurality of input vectors and generate a plurality of output values; a softmax function configured to convert two of the plurality of output values from the teacher neural network for two corresponding input vectors into two corresponding soft labels; a mixup generator configured to combine the two corresponding input vectors to form a synthesized data vector; a masker configured to form a masked soft label vector from the two corresponding soft labels; and the student neural network configured to receive the synthesized data vector and masked soft label and train the student neural network based on an error calculated from the masked soft label.

In accordance with yet another embodiment of the present invention, a non-transitory computer readable storage medium comprising a computer readable program for training a student neural network is provided. The computer readable program includes instructions for feeding a data set including a plurality of input vectors into a teacher neural network to generate a plurality of output values, and converting two of the plurality of output values from the teacher neural network for two corresponding input vectors into two corresponding soft labels. The computer readable program further includes instructions for combining the two corresponding input vectors to form a synthesized data vector, and forming a masked soft label vector from the two corresponding soft labels. The computer readable program further includes instructions for feeding the synthesized data vector into the student neural network, using the masked soft label vector to determine an error for modifying weights of the student neural network, and modifying the weights of the student neural network.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
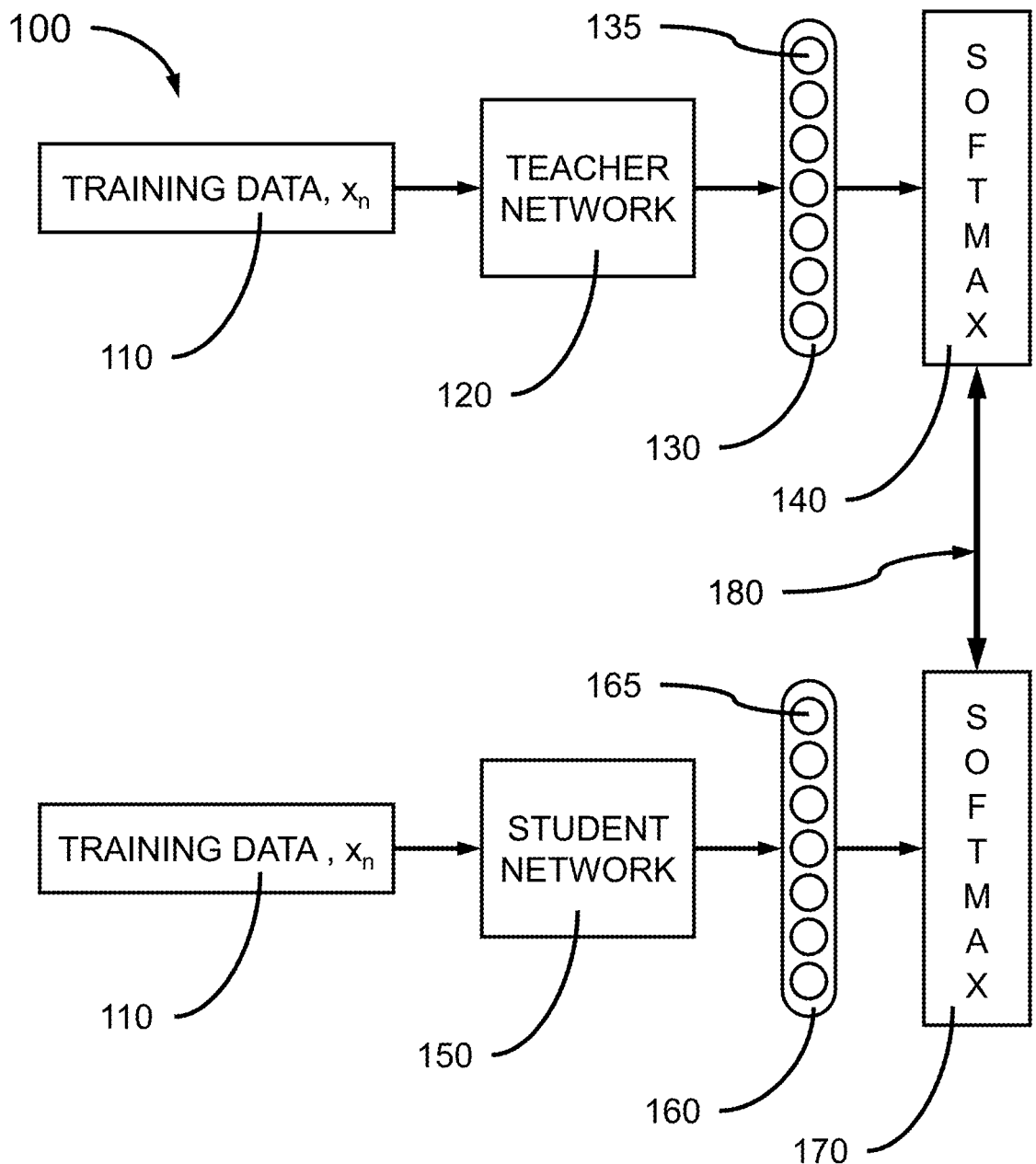
FIG. 1 is a block/flow diagram showing a system/method of training a student neural network using knowledge distillation utilizing a soft target (label) generated by a teacher network rather than a hard target (one-hot vector), in accordance with an embodiment of the present invention.

Embodiments of the present invention relate to methods and systems that provide knowledge distillation training to train a student network by using a soft target generated by the teacher network rather than a hard target (one-hot vector), when the same training data is input to both the teacher and student network. The provided methods and systems can use the difference between the predicted output from the student and that from the teacher network as a soft target and minimized the difference while training the student. The teacher network can be trained using a hard target prior to the knowledge distillation processing. If the student network is set to replicate the behavior of the teacher network, which has already utilized a larger solution space, the student network can be expected to have its convergence space overlap with the original teacher network convergence space.

In various embodiments, a complex deep neural network (i.e., the teacher network) can be trained using a complete dataset with hard targets/labels, where this can be conducted offline. The deep neural network can be a multilayer perceptron. A correspondence can be established between the intermediate outputs of the teacher network and the student network. The outputs from the teacher network can be used to backpropagate calculated error values through the student network, so that the student network can learn to replicate the behavior of the teacher network, rather than learn directly with the hard targets/labels. A teacher network can, thereby, effectively transfer its knowledge to student networks of a smaller size.

In various embodiments, the approach constructs virtual training examples by linearly combining both input features and output labels. In various embodiments, the method can combine an arbitrarily chosen pair of training samples and their associated soft labels to generate new training data: $x = (1-\lambda)x_i + \lambda x_j$; $y = (1-\lambda)y_i + \lambda y_j$;

where $x_i$ and $x_j$ are raw input vectors, and $y_i$ and $y_j$ are one-hot label vectors associated with the raw input vectors, $x_i$ and $x_j$, respectively. Mixup can be realized by simple weighted interpolation on both input features and target labels without using any domain specific knowledge. In various embodiments, this mixup augmentation can be applied to a knowledge distillation (teacher-student training) framework for speech recognition.

Knowledge distillation can mimic complicated teacher neural networks with a simple student model for test time deployment. However, besides directly making outputs of teacher and student networks similar, many existing methods cannot directly transfer teacher information in other network layers to the student network. Generalized knowledge distillation techniques can supplement missing information or compensate for inferior quality of acoustic features, with privileged information, which may be available only during training time.

Knowledge distillation is a technique to mimic complicated teacher neural networks with a simple student neutral network, where training can be performed in two separate steps. In a first step, a complex teacher neural network, such as bidirectional LSTM, VGG, or ResNet models can be initially trained using hard targets (i.e., one-hot vector(s)). Classification can be carried out by describing each category in a one-hot coded vector, where all values are zeroed out except the one indicating the true class, whose value is 1, where the size of this vector corresponds to the number of nodes in the output layer. For example, if the number of phonemes to be classified is 40, then the size of this one-hot vector would also be 40×1, containing a single 1 value identifying the phoneme.

In an ASR system, the output of a neural network is not a single phoneme (mono-phone) but a combination of several continuous phonemes (e.g., tri-phone, quin-phone, etc.). The value of 1 is set to the position in the one-hot vector corresponding to an input phoneme to the neural network. In contrast to a hard target, a soft target (soft label, or soft output) is not a one-hot vector, instead all the elements in the soft target vector can have a non-zero value. The size of the hard target vector is the same as the soft target vector. The soft target can be automatically generated by a teacher network.

Compact acoustic models for student neural networks can then be trained on the soft label/target outputs of teacher network using a training criteria that minimizes the differences between the student and teacher output distributions. Fast processing (e.g., a small turnaround, real time factor and minimal latency) is beneficial for ASR processing. However, less complex student neural networks can be less accurate and have poorer ASR performance than the more complicated teacher networks. The teacher-student learning (knowledge distillation) can create a more robust neural network with a simple architecture (student neural network), while maintaining a fast processing speed by mimicking the behavior of the teacher network by utilizing soft labels/targets.

In various embodiments, the student neural network can be a Deep Neural Network (DNN) with fewer parameters than the teacher neural network. The size of the student neural network can be based on the power and sophistication of the device (e.g., smart phone, tablet, etc.) on which the student neural network is intended to function, whereas the teacher neural network can be sufficiently complex to provide an accurate model.

Once a large, computationally demanding model has been trained, distillation can be used to transfer the knowledge from the large model to a small model that is more suitable for deployment. The knowledge imbued to the small model is a learned mapping from input vectors to output vectors, rather than learned parameter values of the trained large model. The class probabilities produced by the large model can be utilized as "soft targets" for training the small model.

In various embodiments, knowledge distillation can be used to train efficient student networks with privileged knowledge to enhance the soft labels used to train the student networks. A 'soft' label can be restricted to being a valid probability distribution. "Soft labels" refer to the output feature maps produced by a larger, teacher network after each hidden layer.

Exemplary applications/uses to which the present invention can be applied include, but are not limited to: call center monitoring, car navigation systems, meeting transcription and minutes generation, robot voice control, web browsing by voice command, etc.

It is to be understood that aspects of the present invention will be described in terms of a given illustrative architecture; however, other architectures, structures, components and process features and steps can be varied within the scope of aspects of the present invention.

Referring now to the drawings in which like numerals represent the same or similar elements and initially to FIG. 1, a system/method of training a student neural network using knowledge distillation utilizing a soft target (label) generated by a teacher network rather than a hard target (one-hot vector) is shown, in accordance with an embodiment of the present invention.

In one or more embodiments, training data 110 can be fed to a system 100 including a teacher neural network 120 and a student neural network 150, where the input data can be a set $X=\{x_n, y_n\}$, where n is an index over the training samples, each $x_n$ can be a feature vector, and each output, $y_n$, is an ideal output, $y_n$ (i.e., one-hot vector) corresponding to the feature vector, $x_n$. In various embodiments, vectors $x_i$ and $x_j$ can be fed into the teacher network 120, where $x_i$ and $x_j$ can be raw input vectors that are two different elements of X, and i and j are indexes. In various embodiments, the pair, $\{x_n, y_n\}$, is used for training the teacher model, whereas the student model is trained with a pair of $x_n$ and the actual output generated by teacher model corresponding to $x_n$. In the mixup augmentation, a new training sample $x_n$, is created by weighted interpolation between $x_i$ and $x_j$.

In various embodiments, the teacher neural network 120 can be a recurrent neural network (RNN), including, but not limited to, long short term memory (LSTM), bidirectional long short term memory (BLSTM), and recurrent multilayer perceptrons (RMLP), or a non-recurrent neural network, including, but not limited to, a VVGNET (a Convolutional Neural Network architecture), feed-forward neural network (FFNN), and time-delayed neural network (TDNN). The teacher neural network 120 can have one or more hidden layers that feeds an output layer 130. The teacher network 120 can additionally have fully connected layers in addition to the networks listed above.

In one or more embodiments, the nodes 135 of the output layer 130 of the teacher network 120 can produce raw output values, where the raw output values can be real numbers generated from the input $x_n$ (e.g., $x_i$ and $x_j$) relating to the likelihood of the training data falling into each of the identified classes for the phonemes. In various embodiments, the raw values output by nodes 135 can be from a sequence of phonemes, for example, k–a–s+a+t, k–a–s+u+t, k–a–s+e+t, p–a–t+a+b, center phoneme is "s" or "t", while the preceding phonemes are "k", "p", and "a", and the following phonemes are "a", "e", "u", "i", "t", and "b", where "–" represents preceding phonemes and "+" represents following phonemes. In other words, the phoneme corresponding to an input training sample $x_n$ can be "s", which can be classified to a different class depending on adjacent phonemes. There can be as many nodes 135 as there are phonemes being classified.

The raw output values can be fed to a Softmax function 140 that converts the raw output values into probabilities of the input $x_n$ belonging to the one or more classes and referred to as soft labels, $q=\{q_1, q_2, \ldots, q_k\}$, where k is an index for the nodes 135 in the output layer. The probabilities produced by a softmax will sum to one by design. Thus, when using a Softmax function, in order for the probability of one class to increase, the probabilities of at least one of the other classes decreases by an equivalent amount. An argmax value of this output layer 130 and Softmax function 140 can correspond to the estimated class, $y_n$, of the input, as associated with the one-hot input vector $x_n$.

In various embodiments, a teacher network 120 can be trained with a cross entropy loss.

In one or more embodiments, the same training data 110 can be fed into a student neural network 150, where the input data can be a set $X=\{x_n, y_n\}$, where n is an index over the training samples, each $x_n$ can be a feature vector, and each output, $y_n$, is an ideal output, $y_n$ (i.e., one-hot vector) corresponding to the feature vector, $x_n$. In various embodiments, vectors $x_i$ and $x_j$ can be fed into the teacher network 120, where $x_i$ and $x_j$ can be raw input vectors, and i and j are indexes. In various embodiments, the input data can be a sequence of phonemes, where the one-hot vector identifies the class of the phoneme.

In one or more embodiments, the student neural network 150 can be a deep neural network (DNN), including, but not limited to, multilayer perceptrons (MLP) and convolutional neural networks (CNN). The student neural network 150 can have one or more hidden layers that feeds an output layer 160. The student neural network 150 can be less complex than the teacher neural network 120, for example, by having fewer hidden layers and/or fewer connections between nodes, and/or fewer free parameters/weights.

In one or more embodiments, the nodes 165 of the output layer 160 of the student network 150 can produce raw output values, where the raw output values can be real numbers generated from the input $x_n$, relating to the likelihood of the training data falling into each of the identified classes. The raw output values can be fed to a Softmax function 170 that converts the raw output values into probabilities of the input $x_n$ belonging to the one or more classes. The probabilities produced by a softmax will sum to one by design. Thus, when using a Softmax function, in order for the probability of one class to increase, the probabilities of at least one of the other classes decreases by an equivalent amount. An argmax value of this output layer 160 and Softmax function 170 can correspond to the estimated class, $y_n$, of the input, as associated with the one-hot input vector $x_n$.

In one or more embodiments, once the larger, more complex teacher neural network 120 has been trained on the training set, $X=\{x_n, y_n\}$, and the soft labels generated by the Softmax function 140, the soft labels, q={$q_1, q_2, \ldots, q_k$}, can be applied 180 to the loss function for training the student neural network 150.

$$\mathcal{L}(\theta) = -\Sigma_k q_k \log p_k;$$

where q={$q_1, q_2, \ldots, q_k$} are the soft label(s) from the teacher network 120, which also works as a pseudo label; and where p={$p_1, p_2, \ldots, p_k$} is an output probability of the class generated by the student network 150; and "k" is an index for the node(s) in the output layer(s) of the neural networks. The difference between the soft label(s) from the teacher network 120 and the Softmax values of the student network 150 can be fed back into the student network to train the weights for student network 150. This can train the student network to mimic the teacher network's knowledge (logits), while simplifying the student network architecture and complexity. The logit function or the log-odds is the logarithm of the odds p/1-p, where p is a probability.

An $f_k$ can be regarded as a function to produce posterior probability of node k for input feature $x_n$ on student network $g_k$ is regarded as a function to produce posterior probability of node k for input feature $x_n$ on teacher network 120, where $f_k$ refers to the same process used to obtain the predicted output from the student as described above, and $g_k$ refers to the same process for the teacher network as described above. $p_k = f_k(x_n)$; $q_k = g_k(x_n)$, where $p_k$ is an output probability of the class from the student network, and $q_k$ is a soft label from the teacher network, which also works as a pseudo label, p.

Figure 2:
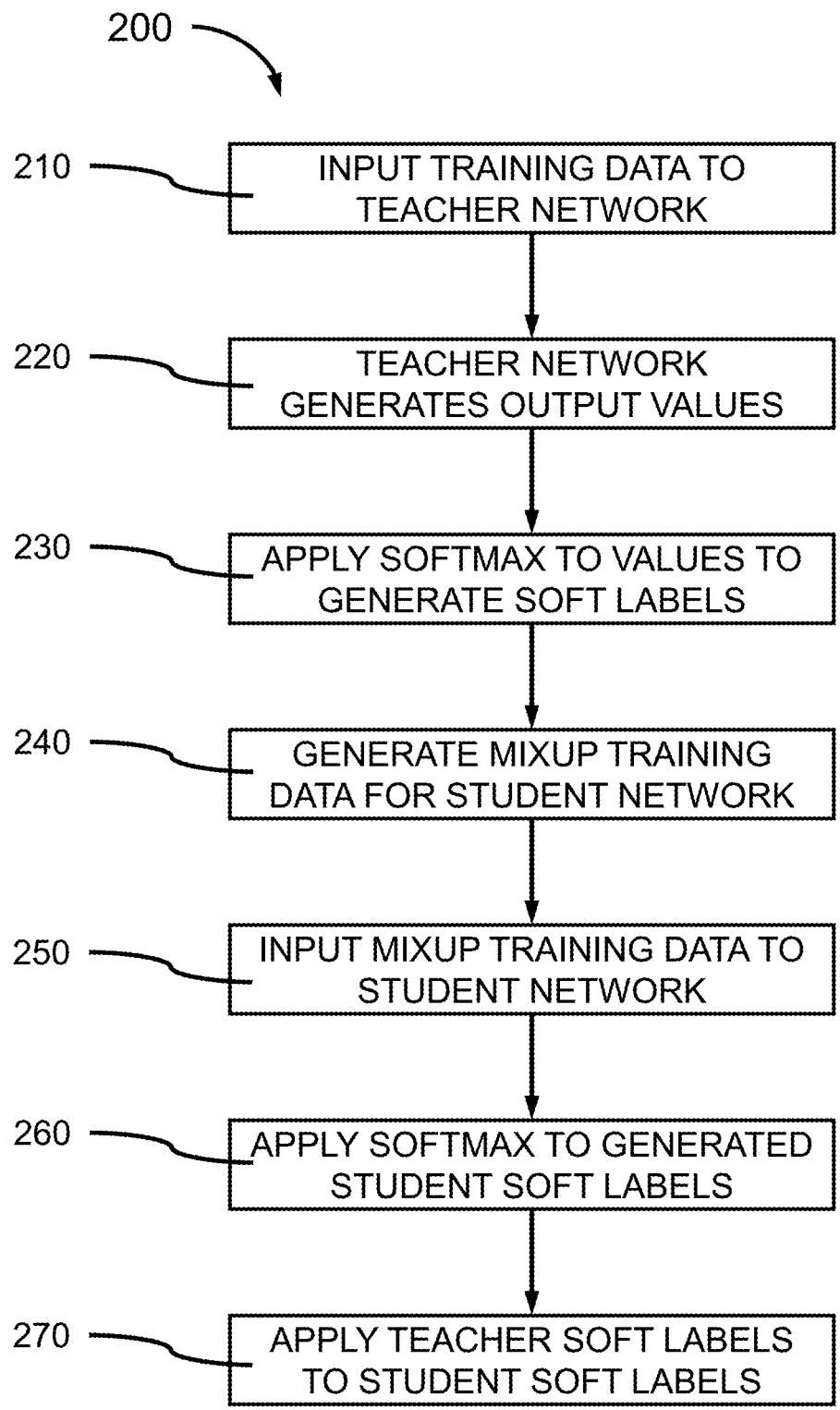
FIG. 2 is a block/flow diagram showing a system/method for training a student neural network using knowledge distillation utilizing a soft target generated by a teacher network, in accordance with an embodiment of the present invention.

FIG. 2 is a block/flow diagram showing a system/method for training a student neural network using knowledge distillation utilizing a soft target generated by a teacher network, in accordance with an embodiment of the present invention.

At block 210 of training method 200, training data is input into a teacher neural network, where the training data can be a set of input-output pairs, ($x_n, y_n$), where the expected output, $y_n$, is a ground truth (e.g., one-hot label). The training set, X={$x_n, y_n$} can be a discrete time series or digitalized time series data, where the time series can be, for example, phonemes. The training set can be fed into the input node(s) of a teacher neural network, where the teacher neural network can be a recurrent neural network having one or more hidden layers and an output layer. The teacher neural network can be trained on the training set, X={$x_n, y_n$}, to identify the class of the input vectors, $x_n$.

At block 220, the teacher network can generate soft labels from the input data, where the trained teacher network produces output values at output nodes of the teacher neural network.

At block 230, the output values at output nodes can be operated on by a softmax function that converts the raw output values from the output nodes into probabilities of the input $x_n$ belonging to the one or more predefined classes, where the probabilities can be referred to as soft labels, q={$q_1, q_2, \ldots, q_k$}. The softmax function is a function that turns a vector of K real values into a vector of K real values that sum to 1. The input values can be positive, negative, zero, or greater than one, where the softmax function can transform them into values between 0 and 1 that add up to 1, so that they can be interpreted as probabilities.

At block 240, Mixup augmentation can be applied to the input features/vectors, $x_i$ and $x_j$ and Teacher Softmax Labels to generate Mixup training pairs. The generated Mixup training pairs can be fed into the student neural network. $x=(1-\lambda)x_i+\lambda x_j$; $q=(1-\lambda)q_i+\lambda q_j$ In various embodiments, a knowledge distillation training approach can define a loss function as:

$$\mathcal{L}(\theta) = -\Sigma_k q_k \log p_k;$$

where q={$q_1, q_2, \ldots, q_k$} is the soft label from the teacher network, which works as a pseudo label; p={$q_1, p_2, \ldots, p_k$} is an output probability of the class from the student network; and k is an index for the node(s) in the output layer(s) of the neural network. $p_k$ is the output probability of the class produced by the student network. $p_k = f_k(x_n)$; $q_k = g_k(x_n)$. $f_k$ is a function to produce a posterior probability of node k for an input feature $x_n$ on the student network. $g_k$ is a function to produce a posterior probability of node k for an input feature $x_n$ on the teacher network, where $x_n$ is used for both $g_k$ and $f_k$.

In various embodiments, instead of using the ground truth labels, the knowledge distillation training approach can define a loss function with an index of context dependent phones k as:

$$\mathcal{L}(\theta) = -\Sigma_k q(k|x) \log p(k|x);$$

where q(k|x) is the so-called soft label from the teacher network for input feature $x \in \hat{X}$, which also works as a pseudo label. p(k|x) is the output probability of the class from the student network. With soft labels q(k|x), competing classes can have small but non-zero posterior probabilities for each training example. The KL-divergence criterion used for training the student model equivalently also minimizes the cross entropy of the soft target labels. Usually, the same acoustic feature inputs are used to generate posteriors q(k|x) and p(k|x).

In various embodiments, Mixup augmentation can be applied to the knowledge distillation framework in speech recognition by inputting feature(s) $x_i$ and $x_j$, respectively, into the teacher network. Then, soft labels $q_i$ and $q_j$ can be generated from $x_i$ and $x_j$ and are mixed using an interpolation factor (i.e., weight), $\lambda$. The student network is trained with a synthesized pair, x and q, where:

Teacher input: $x_i \rightarrow$ output probability, $q_i$, $x_j \rightarrow$ output probability, $q_j$;

Student Mixup: $x=(1-\lambda)x_i+\lambda x_j \rightarrow$ output probability, p;

Student Soft label: $q=(1-\lambda)q_i+\lambda q_j$.

The value, $\lambda$, is an interpolation weight (a scalar value) when $x_i$ and $x_j$ (and $q_i$ and $q_j$) are mixed. $\lambda$ can be in the range of 0 to 1, where if $\lambda$ is close to 1, a new x is similar to $x_j$. The best interpolation weight $\lambda$ can be found by doing experiments with a development set.

In various embodiments, training sample(s) $x_i$ and $x_j$ are mixed with an interpolation weight $0<\lambda<0.5$, so characteristics of the base sample, $x_i$, can be dominant in the mixed training sample. Soft labels can represent a distribution of likelihoods (probability) for each phoneme. Therefore, if the component of $q_i$ is less than that of $q_j$, the component in $q_i$ can be unreliable because the mixed training sample mainly has characteristics of the base training sample $x_i$.

At block 250, a set of the synthesized training pairs, x, q can be used to train the student network, where q is the synthesized soft label corresponding to the synthesized mixup vector, x. Each of the synthesized input vector(s), x, can be fed into the student network. The student neural network can generate output values for each inputted synthesized input vector, $x_m$.

At block 260, a softmax function can be applied to the values output by the output layer of the student network to produce soft labels. In various embodiments, the student network can generate soft labels from the synthesized input vectors, x, that can be compared to the synthesized soft label, q, corresponding to the input vectors, x.

At block 270, the soft labels can be compared to the combined soft labels, q, of the synthesized training pairs, x, q, to determine an error value for the student network. The calculated error can be fed back into the student neural network and used to adjust the weights of the student network. In various embodiments, the soft labels created by the teacher network are used for updating weights in the student network.

Figure 3:
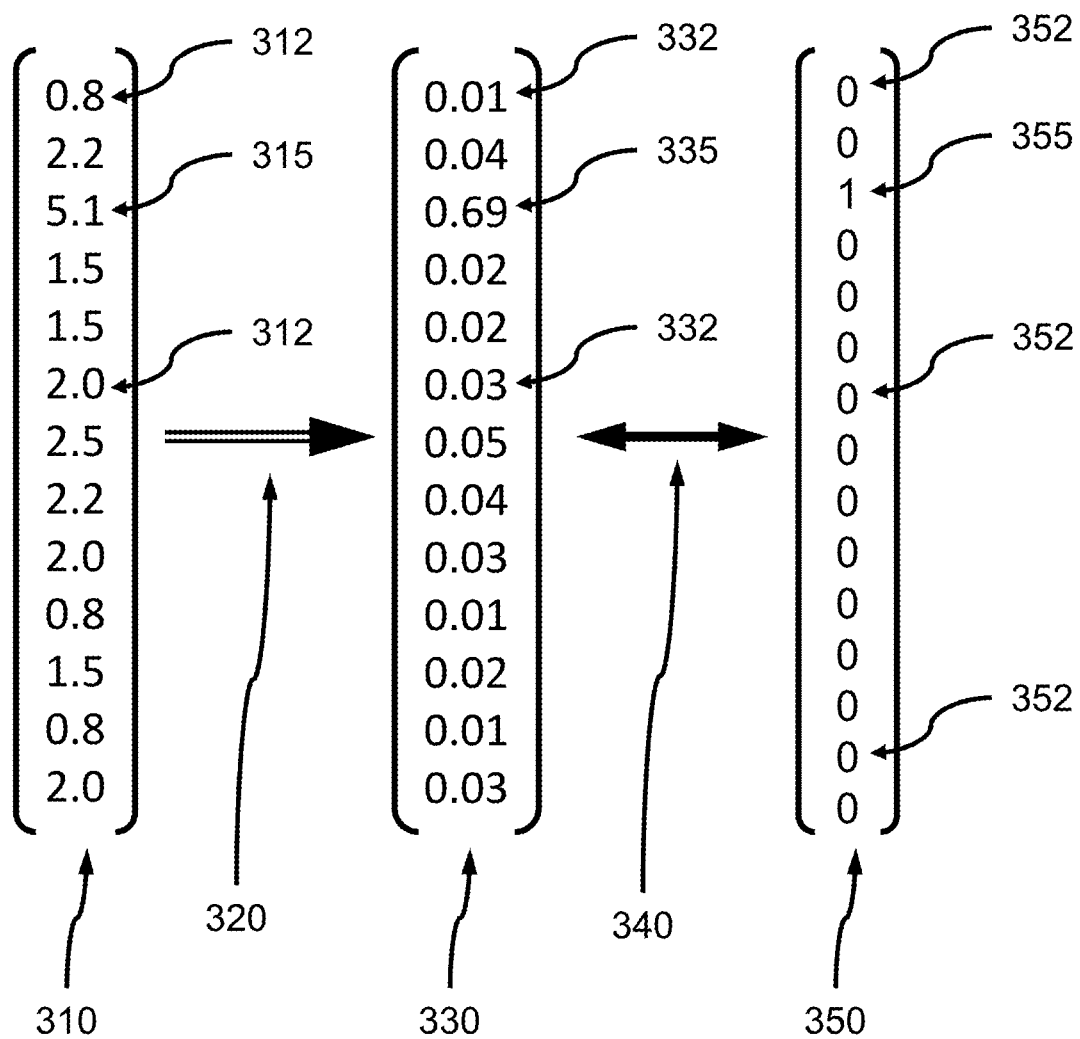
FIG. 3 is a diagram showing the application of a softmax function on output values that may be generated by the teacher neural network to generate probabilities that can then be compared with a one-hot vector, in accordance with an embodiment of the present invention.

FIG. 3 is a diagram showing the application of a softmax function on output values that may be generated by the teacher neural network to generate probabilities that can then be compared with a one-hot vector, in accordance with an embodiment of the present invention.

In one or more embodiments, a set of output values generated by either the teacher neural network or the student neural network can be real numbers that are greater than 1 (i.e, >1) as well as negative values. An output vector 310 that is M×1 dimension can include a dominant value 315 for the most likely class, and M−1 lesser values 312 for the less likely classifications. A softmax function 320 can be applied to the output vector 310 to produce a soft label vector 330 that is also M×1 in dimension. The soft label vector 330 would also have a dominant value 335 for the most likely (highest probability) class, and M−1 lesser values 332 for the less likely (lower probability) classifications. The values of the soft label vector 330 would also be between 0 and 1. The soft label vector 330 can be compared 340 to the one-hot vector 350, to make the soft label vector 330 closer to one (1) of the one-hot vector 350, and the lesser values 332 closer to zero (0) 352 through training. The softmax function 320 can be used to convert output values from the teacher neural network to probabilities, where soft label vector 330 can be created by the softmax function with values in output vector 310.

In various embodiments, the one-hot vector 350 (i.e., hard target) is used for comparison as an ideal output for the neural network(s). The teacher neural network can be trained to minimize the difference between soft label vector 330 and hard target 350, where the hard target 350 can be manually provided with a training corpus. Instead of using hard targets 350 given from the training corpus, soft labels created by the teacher neural network can be used as the ideal output for training the student network through the concept of knowledge distillation. When a neural network is trained on hard targets, predicted outputs from the neural network will gradually get close to the one-hot vector(s) by updating weights in the network by training.

Figure 4:
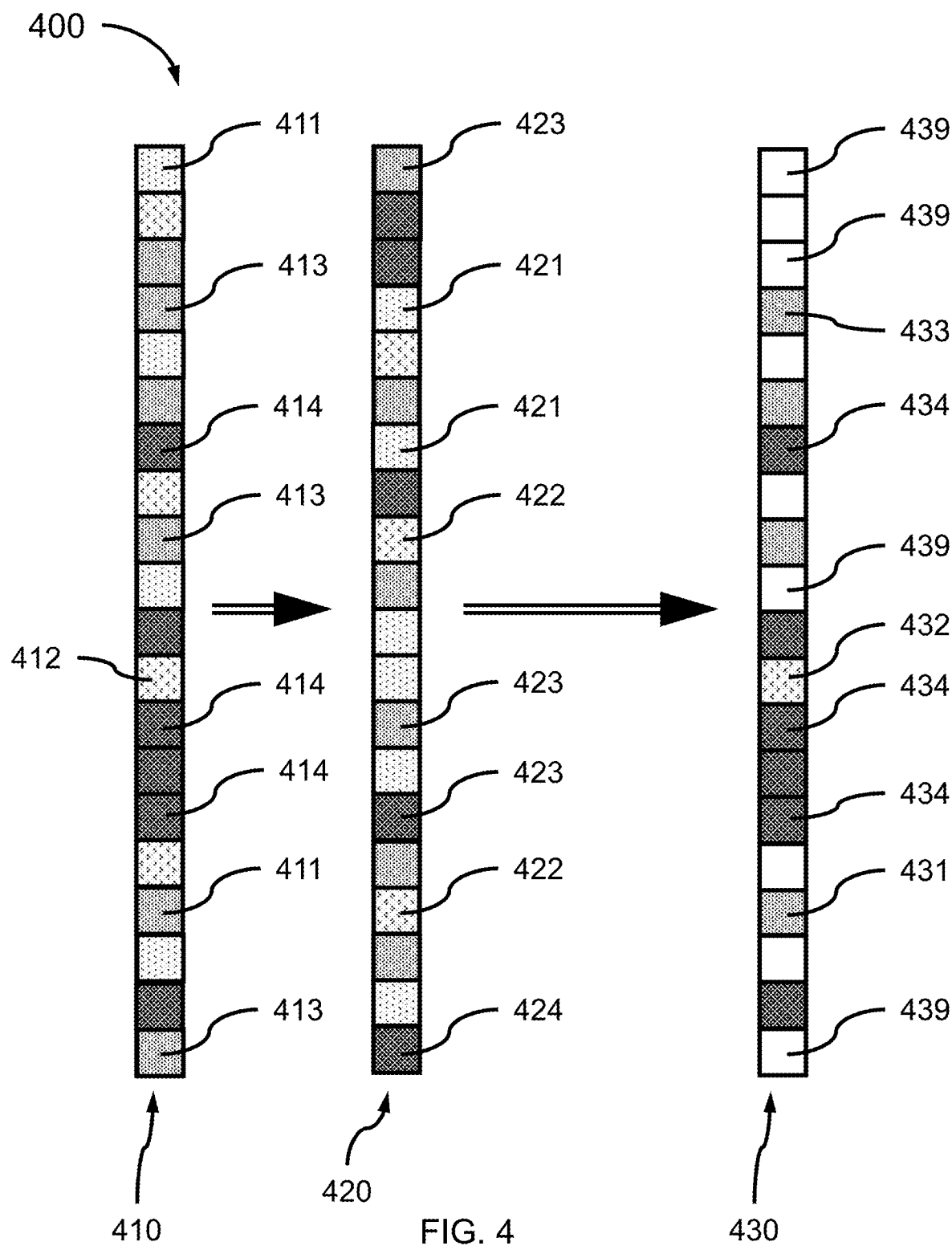
FIG. 4 is a diagram showing the application of masking on the soft labels generated by the teacher neural network, in accordance with an embodiment of the present invention.

FIG. 4 is a diagram showing the application of masking on the soft labels generated by the teacher neural network, in accordance with an embodiment of the present invention.

In various embodiments, a soft label pair ($q_i$ and $q_j$) can be used to generate a masked soft label, $q_m$. Let $x_i$ and $q_i$ be a base training sample pair. Because $x_i$ and $x_j$ are frames that tie together with different phonemes normally, a soft label with a larger interpolation weight (that is $q_i$) may be used for training a student. A speech signal with a larger spectrum power is a main target signal for automatic speech recognition (ASR). In the soft label components of base $q_i$, components that have a smaller value than those of $q_j$ are unreliable because the mixed training sample mainly has characteristics of the base training sample $x_i$ when the interpolation weight $0<\lambda<0.5$. Therefore, the soft label(s) are masked to keep only reliable portions as follows:

Soft label: $\tilde{q}_m = M_m \circ q_i$ (k∈Output Size, e.g., 9300), $$r_k = \begin{cases} 1, & q_{ik} > q_{jk} \\ \varepsilon, & \text{otherwise} \end{cases};$$

where $M_m\{r_1, r_2, \ldots, r_k\}$, "k" is an index for the node(s) in the output layer(s) of the neural network(s), and ε is a constant value $0 \leq \varepsilon < 1$, which can be close to 0, or may be set to 0.

In various embodiments, the interpolation weight can be set to $0<\lambda<0.5$ to keep a base training sample, $x_i$, as a dominant training sample. $q_{ik}$ is soft label when a base training sample (frame) $x_i$ is input to the teacher network while $q_{jk}$ is soft label when $x_j$ is input to the teacher. The soft label components, $q_{ik}$, in $q_i$ are kept if they are greater than those component values, $q_{jk}$, in the other soft label $q_j$, ($q_{ik}>q_{jk}$), otherwise those components are set to zeros.

In a non-limiting exemplary embodiment, a masking process 400 can generate a masked vector 430, where a soft value q vector 410 can include values 411, 412, 413, 414 of varying values, where 414>413>412>411. The soft value $q_j$ vector 420 can include values 421, 422, 423, 424 of varying values, where 424>423>422>421. The soft value $q_i$ vector 410 and soft value $q_j$ vector 420 can be generated by the teacher network. The dark gray/hatched boxes represent a large value in the vector while light gray/hatched boxes represent a small value as an output from teacher neural network. The values of the soft value $q_i$ vector 410 can be masked by comparing each value of soft value $q_i$ vector 410 to the corresponding value of soft value $q_j$ vector 420, and creating the masked vector 430 by placing a zero value (0) 439 in each location of the masked vector 430 by setting ε to zero (0), where the corresponding value of soft value $q_j$ vector 420 is greater than the value of the corresponding soft value $q_i$ vector 410, and placing the values 431, 432, 433, 434 of the soft value $q_i$ vector 410 in each location of the masked vector 430 where the corresponding value of soft value $q_j$ vector 420 is less than the value of the corresponding soft value $q_i$ vector 410. Soft label: $\tilde{q}_m = M_m \circ q_i$. The corresponding value of 433 that equals the value 413 is placed in the corresponding location of the masked vector 430. The corresponding value of 434 that equals the value 414 is placed in the corresponding location of the masked vector 430. The corresponding value of 432 that equals the value 412 is placed in the corresponding location of the masked vector 430. The corresponding value of 431 that equals the value 411 is placed in the corresponding location of the masked vector 430. The parameter ε is a small constant value that can range from 0 to 1 to create a mask for unreliable elements of the soft label. Using zero (0) can be a default value.

In various embodiments, nodes in the output layer of the neural network can correspond to the kinds of phonemes. But we usually consider not a single phoneme but continuous phonemes (before and after several phonemes). For example, if the number of phonemes is 40, an ASR system can be constructed based on 3 continuous phonemes for the output layer, then the total number of nodes would be 40×40×40=64000. However, these 64000 nodes would also represent semantically nonmeaningful phoneme combination, so instead, meaningful phone combinations may only be considered, for example, 9300. In various embodiments, a quinphone having before and after 2 phonemes can be considered in the output layer of the neural network.

Mixup augmentation may be performed only with speech frames (not using silence frames). A mixup can be applied also to silence frames, but focusing only on speech frames can be more effective.

Figure 5:
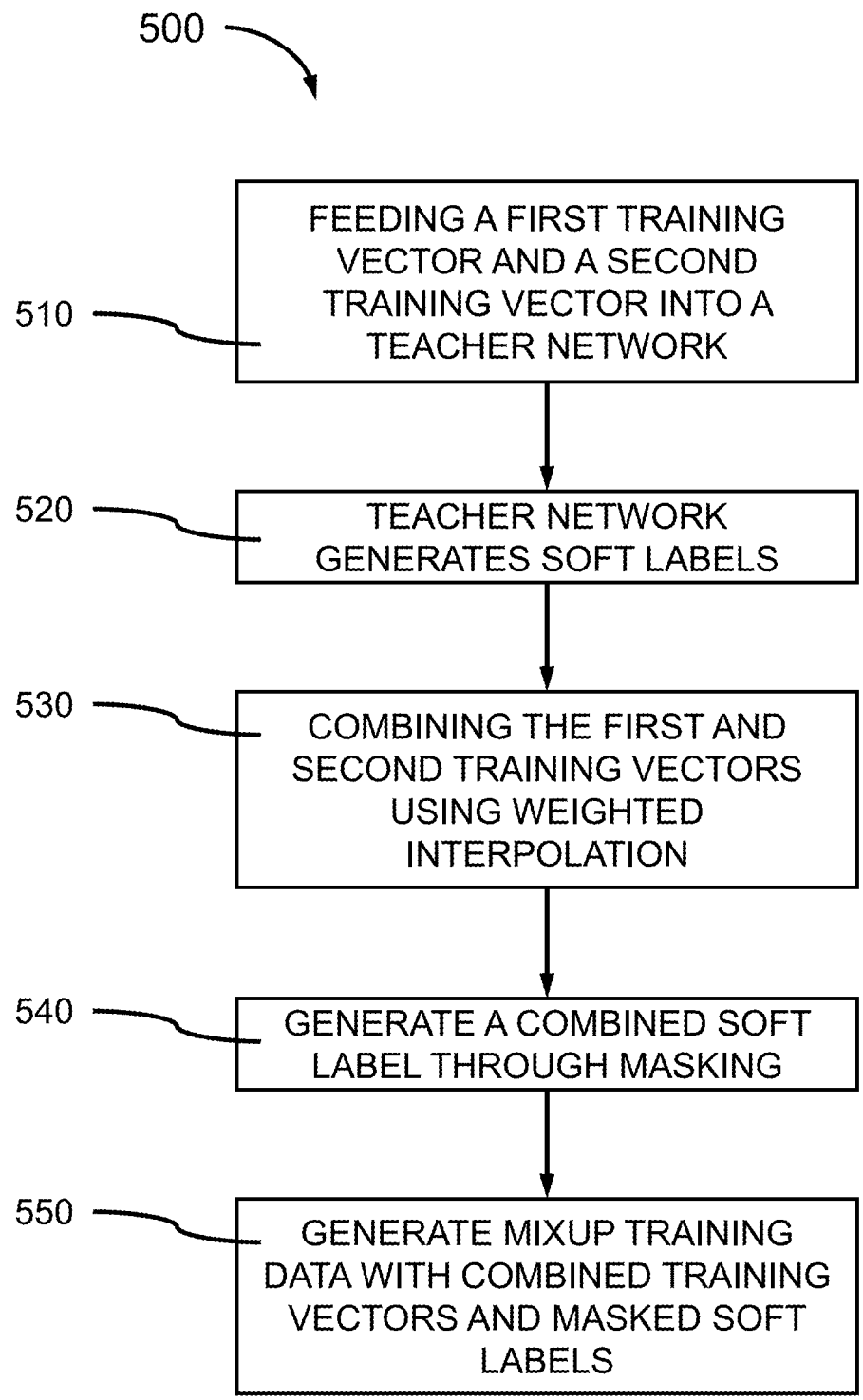
FIG. 5 is a block/flow diagram showing a method for mixup augmentation and masking, in accordance with an embodiment of the present invention.

FIG. 5 is a block/flow diagram showing a method for mixup augmentation and masking, in accordance with an embodiment of the present invention.

In one or more embodiments, a mixup generating method 500 can generate mixup training data with combined training vectors and masked soft label vectors.

At block 510, a first training vector and a second training vector can be fed into a teacher neural network.

At block 520, the teacher network can generate soft labels.

At block 530, the first training vector and a second training vector can be combined using weighted interpolation to produce a combined training vector $x_m$ (also referred to as a synthesized data vector). $x_m = (1-\lambda)x_i + \lambda x_j$.

At block 540, a masked vector of soft labels can be generated through a masking process 400. In various embodiments, an interpolation weight, $\lambda$, can be applied to the soft labels corresponding to the two input vectors to form weighted soft labels, wherein the soft labels corresponding to the two input vectors are weighted using the interpolation weight, $\lambda$. These weighted soft labels can be used to generate masked soft label vectors, where $q_m = (1-\lambda)q_i + \lambda q_j$.

At block 550, the mixup training data can be generated by combining the combined training vector with the masked vector of soft labels.

Figure 6:
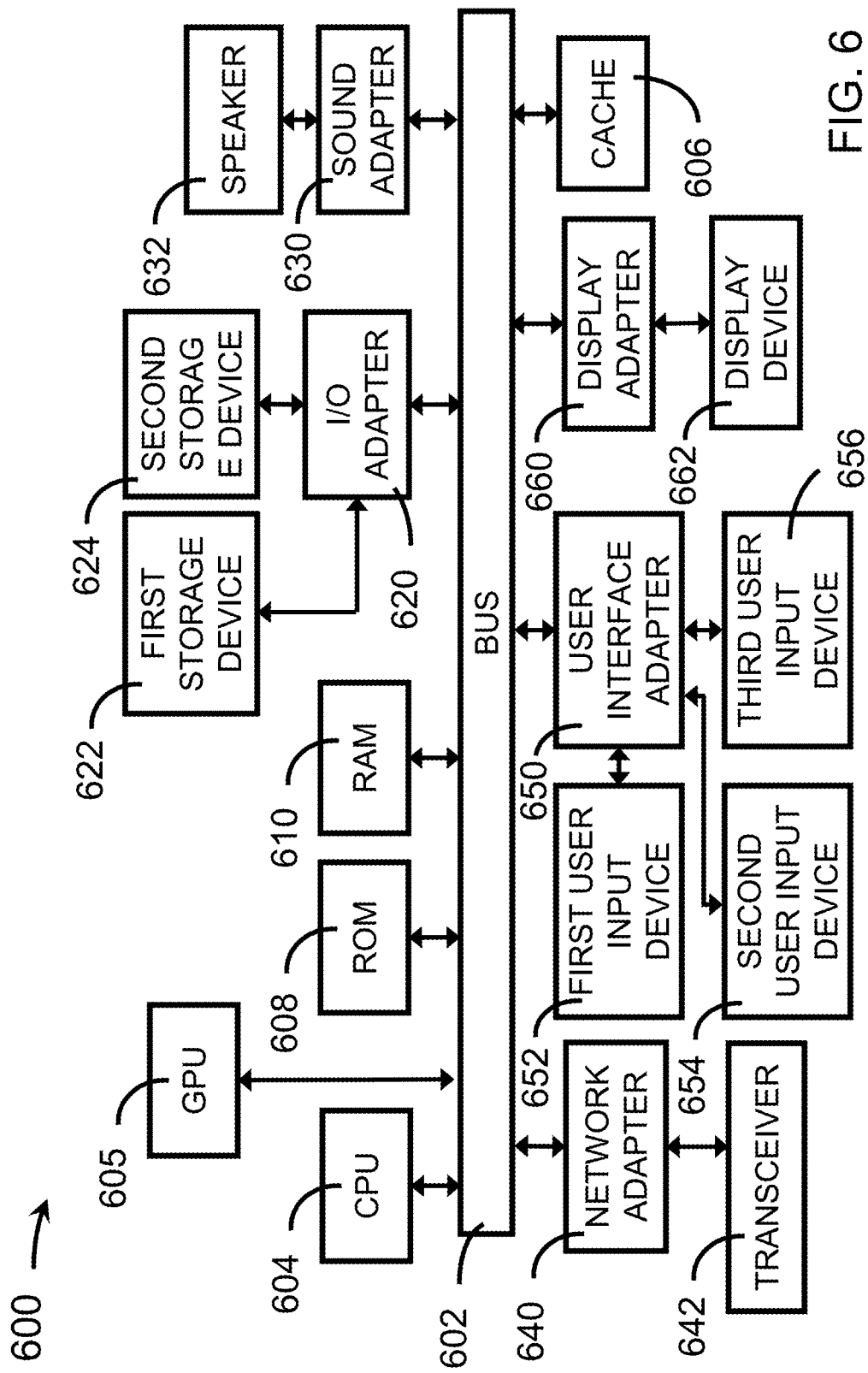
FIG. 6 is an exemplary processing system to which the present methods and systems may be applied, in accordance with an embodiment of the present invention.

FIG. 6 is an exemplary processing system 600 to which the present methods and systems may be applied, in accordance with an embodiment of the present invention.

The processing system 600 can include at least one processor (CPU) 604 and may have a graphics processing (GPU) 605 that can perform vector calculations/manipulations operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, can be operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state device, a magnetic storage device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 can be used to input and output information to and from system 600.

In various embodiments, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Moreover, it is to be appreciated that system 600 is a computer system for implementing respective embodiments of the present methods/systems. Part or all of processing system 700 may be implemented in one or more of the elements of FIGS. 1-5. Further, it is to be appreciated that processing system 600 may perform at least part of the methods described herein including, for example, at least part of the method of FIGS. 1-5.

Figure 7:
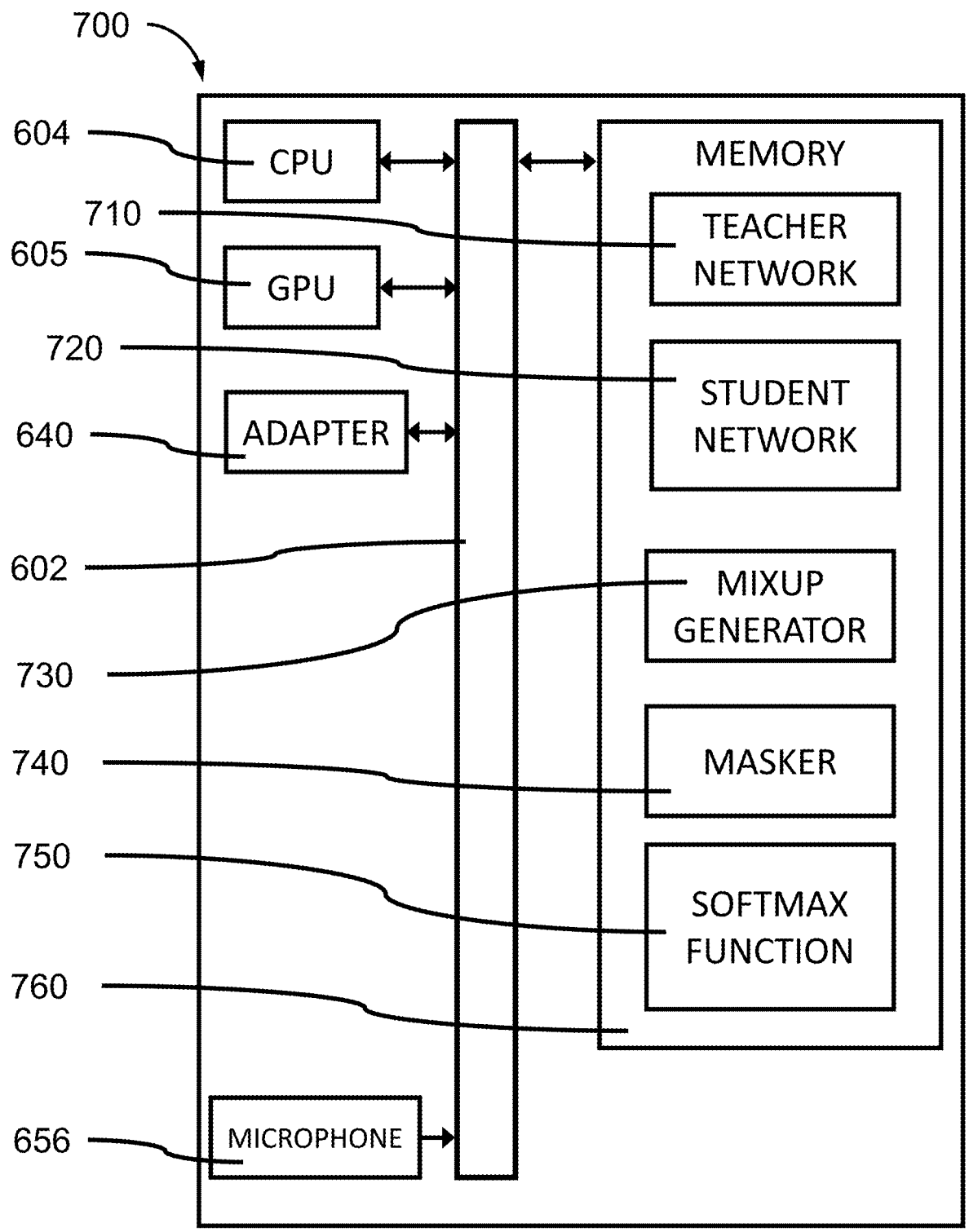
FIG. 7 is an exemplary processing system configured to implement one or more neural networks for modeling road layouts, in accordance with an embodiment of the present invention.

FIG. 7 is an exemplary processing system 700 configured to implement one or more neural networks for modeling road layouts, in accordance with an embodiment of the present invention.

In one or more embodiments, the processing system 700 can be a computer system 600 configured to perform a computer implemented method of training teacher neural networks and student neural networks using mixup training data.

In one or more embodiments, the processing system 700 can be a computer system 600 having memory components 760, including, but not limited to, the computer system's random access memory (RAM) 610, hard drives 622, and/or cloud storage to store and implement a computer implemented method of understanding road layouts from video images. The memory components 760 can also utilize a database for organizing the memory storage.

In various embodiments, the memory components 760 can include a Teacher Neural Network 710 that can be configured to implement a plurality of acoustic models configured to model a acoustic input and perform automatic speech recognition (ASR). In various embodiments, the Teacher Neural Network 710 may be implemented as a Long Short Term Memory (LSTM) or bidirectional LSTM (BLSTM). The Teacher Neural Network 710 can also be configured to receive as input acoustic signals, for example, a sequence of phonemes, and learn to identify words and context from the sequence of phonemes. The input can be a sequential set of phonemes received by a microphone 656. The Teacher Neural Network 710 can also be configured to generate output values and soft labels.

In various embodiments, the memory components 760 can include a Student Neural Network 720 that can be configured to learn one or more acoustic models from the Teacher Neural Network 710, and configured to model an acoustic input and perform automatic speech recognition (ASR). In various embodiments, the Student Neural Network 720 may be implemented as a Deep Neural Network (e.g., multilayer perceptron) that is smaller (e.g., fewer nodes and/or layers) and less complex (e.g., fewer free parameters to be taught) than the Teacher Neural Network 710. The Student Neural Network 720 can also be configured to generate output values and soft labels.

In various embodiments, the memory components 760 can include a Mixup Generator 730 that can be configured to combine two separate sets of training data and corresponding soft labels, where the training data can be features/vectors, $x_i$ and $x_j$. The Mixup Generator 730 that can be configured to produce Student Mixup and Student Soft label training pairs.

In various embodiments, the memory components 760 can include a Masker 740 configured to convert two soft value $q_i$ vectors into a masked vector. The Masker 740 can be configured to receive two soft value $q_i$ vectors and perform a masking process to generate the masked vector.

In various embodiments, the memory components 760 can include a Softmax Function 750 configured to generate soft labels from the output values of the Teacher Neural Network 710 and the Student Neural Network 720. The output can be input into an error function to adjust the weights of the Teacher Neural Network 710 and the Student Neural Network 720 and/or displayed on a screen for viewing and implementation by a user.

Figure 8:
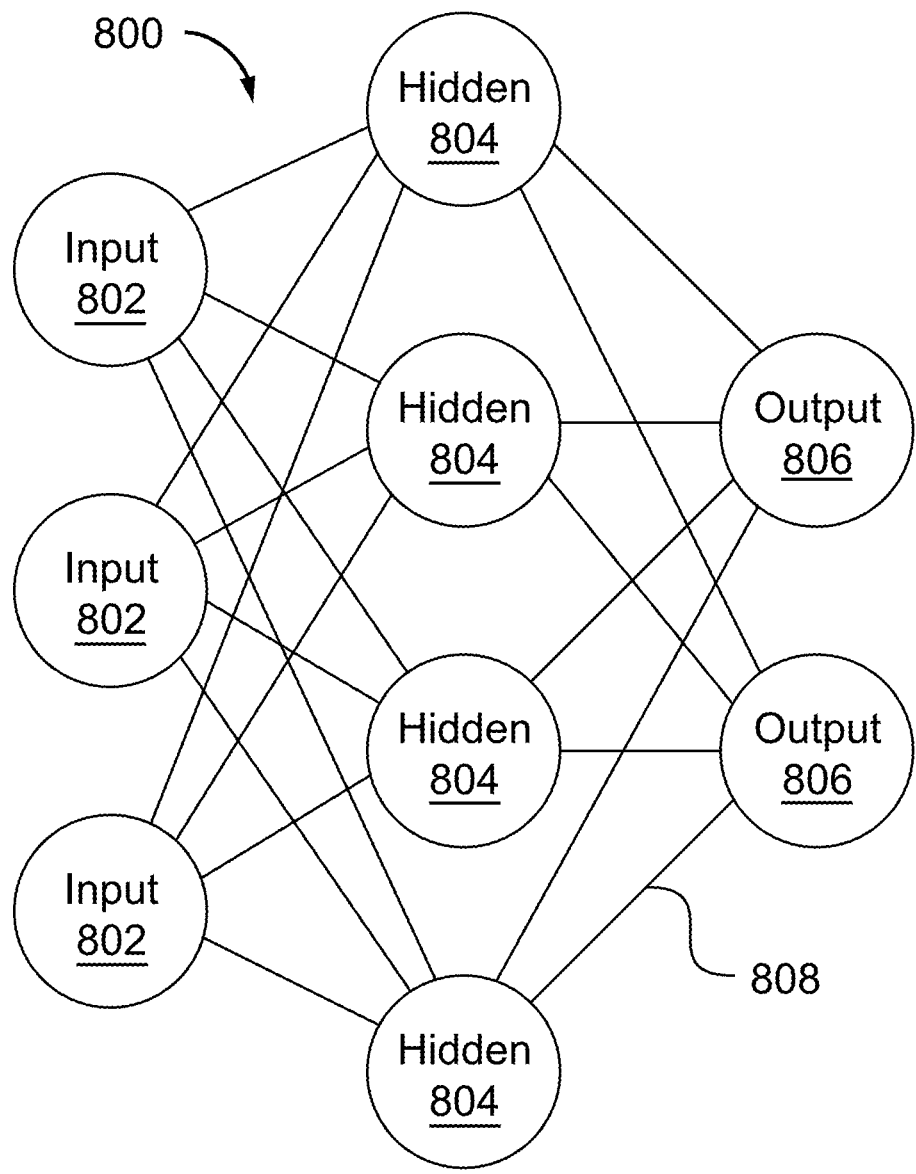
FIG. 8 is a block diagram illustratively depicting an exemplary neural network 800 in accordance with another embodiment of the present invention.

FIG. 8 is a block diagram illustratively depicting an exemplary neural network in accordance with another embodiment of the present invention.

A neural network 800 may include a plurality of neurons/nodes, and the output nodes may communicate using one or more of a plurality of connections 808. The neural network 800 may include a plurality of layers, including, for example, one or more input layers 802, one or more hidden layers 804, and one or more output layers 806. In one embodiment, nodes at each layer may be employed to apply any function (e.g., input program, input data, etc.) to any previous layer to produce output, and the hidden layer 804 may be employed to transform inputs from the input layer (or any other layer) into output for nodes at different levels.

Figure 9:
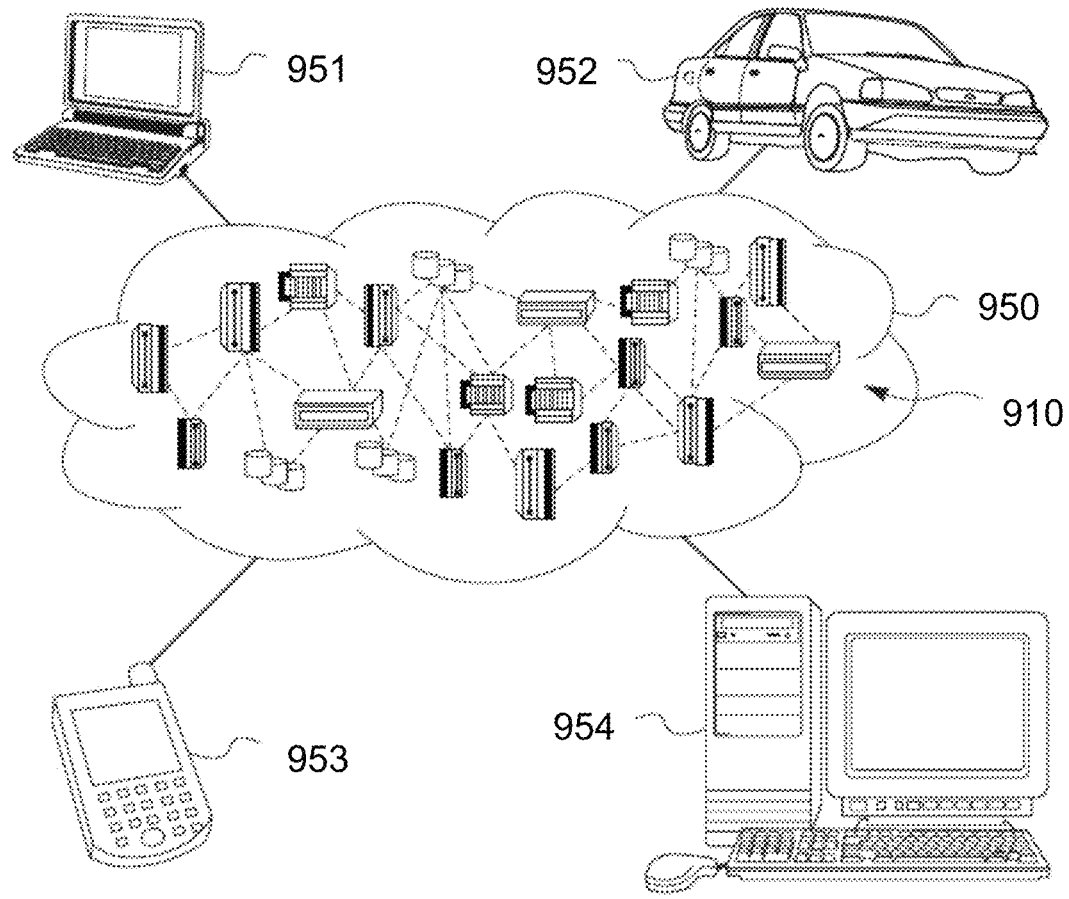
FIG. 9 is a block diagram showing an illustrative cloud computing environment having one or more cloud computing nodes with which local computing devices used by cloud consumers communicate in accordance with one embodiment.

FIG. 9 is a block diagram showing an illustrative cloud computing environment having one or more cloud computing nodes with which local computing devices used by cloud consumers communicate in accordance with one embodiment.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 951, desktop computer 952, laptop computer 953, and/or automobile computer system 954 may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 951, 952, 953, 954 shown in FIG. 9 are intended to be illustrative only and that computing nodes 110 and cloud computing environment 950 can communicate with any type of computerized device over any type of network and/or network addressable connection (e.g., using a web browser).

Figure 10:
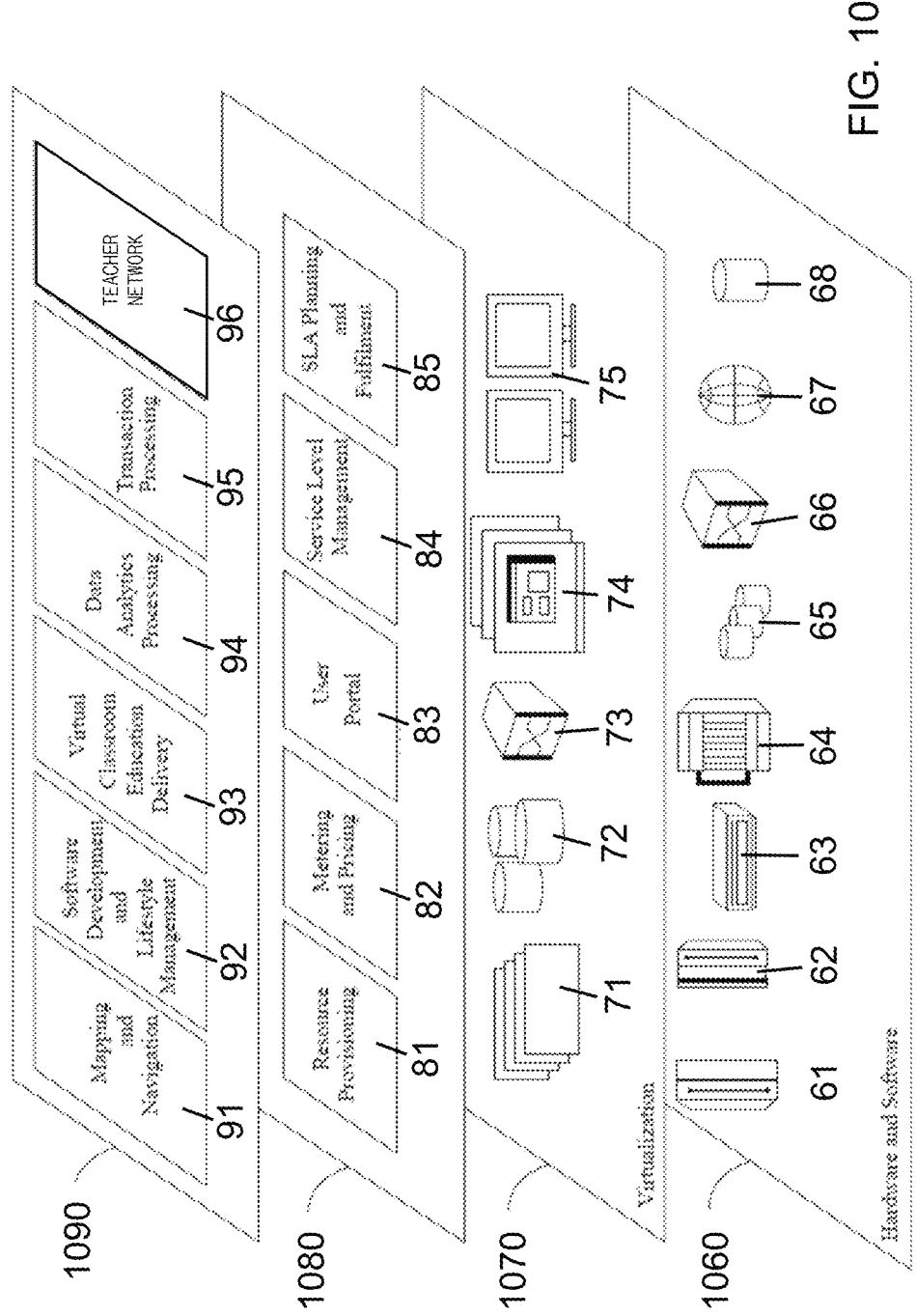
FIG. 10 is a block diagram showing a set of functional abstraction layers provided by a cloud computing environment in accordance with one embodiment.

FIG. 10 is a block diagram showing a set of functional abstraction layers provided by a cloud computing environment in accordance with one embodiment.

Referring now to FIG. 10, a set of functional abstraction layers provided by a cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 61; RISC (Reduced Instruction Set Computer) architecture based servers 62; servers 63, blade servers 64; storage devices 65; and networks and networking components 66. In some embodiments, software components include network application server software 67 and database software 68.

Virtualization layer 1070 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 1080 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a teacher neural network 96, where the teacher neural network can be a recurrent neural network configured to learn automatic speech recognition and prepare a student neural network.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for training a student neural network, comprising:
   feeding a data set including a plurality of input vectors into a trained teacher neural network to generate a plurality of output values that correspond to the plurality of input vectors;
   converting a pair of the plurality of output values from the trained teacher neural network for a pair of corresponding input vectors into a pair of corresponding soft labels;
   combining the pair of corresponding input vectors to form a synthesized data vector;
   forming a masked soft label vector to mask components from the pair of corresponding soft labels from the synthesized data vector that have an interpolation weight value less than other components from the pair of corresponding soft labels having characteristics of a base training sample from the data set;
   training the student neural network to perform speech-to-text conversion by:
      feeding the synthesized data vector into the student neural network;
      employing the masked soft label vector to determine an error for modifying weights of the student neural network; and
      modifying the weights of the student neural network.

2. The method of claim 1, wherein the trained teacher neural network is a recurrent neural network and the student neural network is a multilayer perceptron (MLP).

3. The method of claim 1, wherein each of the plurality of input vectors represents a sequence of phonemes.

4. The method of claim 1, further comprising forming the masked soft label vector by comparing the output values from the trained teacher neural network of a first of the pair of input vectors to the corresponding output values from the teacher neural network of a second of the pair of input vectors.

5. The method of claim 4, wherein the output values are converted from the trained teacher neural network into soft labels using a softmax function.

6. The method of claim 5, wherein the input vectors are combined using $x=(1-\lambda)x_i+\lambda x_j$ with interpolation weight, $\lambda$, where $0<\lambda<0.5$.

7. The method of claim 6, further comprising applying an interpolation weight to the soft labels corresponding to the pair of input vectors to form weighted soft labels, wherein the soft labels corresponding to the pair of input vectors are weighted using the interpolation weight, $\lambda$.

8. A processing system for training a student neural network, comprising:
   one or more processor devices;
   a memory in communication with at least one of the one or more processor devices; and
   a display screen;
   wherein the memory includes:
   a teacher neural network configured to receive a data set including a plurality of input vectors and trained to generate a plurality of output values that correspond with the plurality of input vectors;
   a softmax function configured to convert a pair of the plurality of output values from the teacher neural network for a pair of corresponding input vectors into a pair of corresponding soft labels;
   a mixup generator configured to combine the pair of corresponding input vectors to form a synthesized data vector;
   a masker configured to form a masked soft label vector to mask components from the pair of corresponding soft labels from the synthesized data vector that have an interpolation weight value less than other components from the pair of corresponding soft labels having characteristics of a base training sample from the data set; and
   the student neural network configured to receive the synthesized data vector and masked soft label and train the student neural network based on an error calculated from the masked soft label to perform speech-to-text conversion.

9. The processing system of claim 8, wherein the teacher neural network is a recurrent neural network and the student neural network is a multilayer perceptron (MLP).

10. The processing system of claim 8, wherein each of the plurality of input vectors represents a sequence of phonemes.

11. The processing system of claim 8, wherein the masker is configured to form the masked soft label vector by comparing the output values from the teacher neural network of a first of the pair of input vectors to the corresponding output values from the teacher neural network of a second of the pair of input vectors.

12. The processing system of claim 11, wherein the input vectors are combined using $x=(1-\lambda)x_i+\lambda x_j$ with interpolation weight, $\lambda$, where $0<\lambda<0.5$.

13. The processing system of claim 12, wherein the mixup generator is further configured to apply an interpolation weight to the soft labels corresponding to the pair of input vectors to form weighted soft labels, and wherein the soft labels corresponding to the pair of input vectors are weighted using the interpolation weight, $\lambda$.

14. A non-transitory computer readable storage medium comprising a computer readable program for training a student neural network, wherein the computer readable program when executed on a computer causes the computer to perform;
   feeding a data set including a plurality of input vectors into a trained teacher neural network to generate a plurality of output values that correspond with the plurality of input vectors;
   converting a pair of the plurality of output values from the trained teacher neural network for a pair of corresponding input vectors into a pair of corresponding soft labels;
   combining the pair of corresponding input vectors to form a synthesized data vector;
   forming a masked soft label vector to mask components from the pair of corresponding soft labels from the synthesized data vector that have an interpolation weight value less than other components from the pair of corresponding soft labels having characteristics of a base training sample from the data set;

training the student neural network to perform speech-to-text conversion by:
- feeding the synthesized data vector into the student neural network;
- using the masked soft label vector to determine an error for modifying weights of the student neural network; and
- modifying the weights of the student neural network.

15. The computer readable program of claim 14, wherein the trained teacher neural network is a recurrent neural network and the student neural network is a multilayer perceptron (MLP).

16. The computer readable program of claim 14, wherein each of the plurality of input vectors represents a sequence of phonemes.

17. The computer readable program of claim 14, further comprising forming the masked soft label vector by comparing the output values from the teacher neural network of a first of the pair of input vectors to the corresponding output values from the trained teacher neural network of a second of the pair of input vectors.

18. The computer readable program of claim 17, wherein the output values are converted from the trained teacher neural network into soft labels using a softmax function.

19. The computer readable program of claim 18, wherein the input vectors are combined using $x=(1-\lambda)x_i+\lambda x_j$ with interpolation weight, $\lambda$, where: $0<\lambda<0.5$.

20. The computer readable program of claim 19, further comprising applying an interpolation weight to the soft labels corresponding to the pair of input vectors to form weighted soft labels, wherein the soft labels corresponding to the pair of input vectors are weighted using the interpolation weight, $\lambda$.

* * * * *